K. ALBERT.

OPEN HEARTH FURNACE.

APPLICATION FILED JAN. 29, 1914.

Reissued July 7, 1914. 13,763.

2 SHEETS—SHEET 1.

Witnesses:
Arthur Chapman
A. P. Hammond

Inventor
Kurt Albert,
By his Attorney
C. Alfred Fox

K. ALBERT.

OPEN HEARTH FURNACE.

APPLICATION FILED JAN. 29, 1914.

Reissued July 7, 1914.

13,763.

2 SHEETS—SHEET 2.

Witnesses:

Arthur Chaquet

W. P. Hammond

Inventor

Kurt Albert.

By his Attorney

Clifford E. Dunn

UNITED STATES PATENT OFFICE.

KURT ALBERT, OF WIESBADEN, GERMANY.

OPEN-HEARTH FURNACE.

13,763. Specification of Reissued Letters Patent. Reissued July 7, 1914.

Original No. 1,073,653, dated September 23. 1913, Serial No. 737,110. Application for reissue filed January 29, 1914. Serial No. 815,322.

*To all whom it may concern:*

Be it known that I, KURT ALBERT, a citizen of Germany, and a subject of the King of Prussia and Emperor of Germany, residing at Wiesbaden, in the Kingdom of Prussia and Empire of Germany, have invented new and useful Improvements in Open-Hearth Furnaces, of which the following is a specification.

My invention relates to furnaces for working up materials containing not only iron or ferric oxid but also volatile metals, the purpose being to recover the volatile metals in addition to manufacturing the iron.

When it is desired to work up materials containing both iron or ferric oxid and, in addition, volatile metals such as galvanized iron, zinciferous calcined pyrites and the like, and simultaneously to obtain not only a high quality iron, but also the volatile metals as such or as their oxids, the furnace requisite for this purpose must be capable of developing the degree of heat which is necessary for the usual open-hearth process, and which can only be obtained by means of the Siemens regenerative chamber system. During the first period of the operation of the furnace, when the volatile metals, either in the form of metals or their oxids, are eliminated, the waste gases leaving the hearth-chamber and containing such metals or their oxids, must not pass through the chambers of an ordinary open-hearth furnace, because the chambers would in a very short time become more or less choked up and consequently either impair the working of the furnace or cause the complete stoppage of the smelting process.

The primary object of my invention is to provide an improved furnace for working up such materials so constructed as to avoid the passage of the waste gases through the chambers of the furnace and which nevertheless enables the waste gases to be utilized during the volatilization period. I attain this end by means of a furnace which, like the open-hearth furnace, has chambers for preliminarily heating the air and gas, but is so arranged that the combustion gases are able to pass through suitable, readily cleaned flues, chambers or other heat-recovering apparatus.

Figure 1:
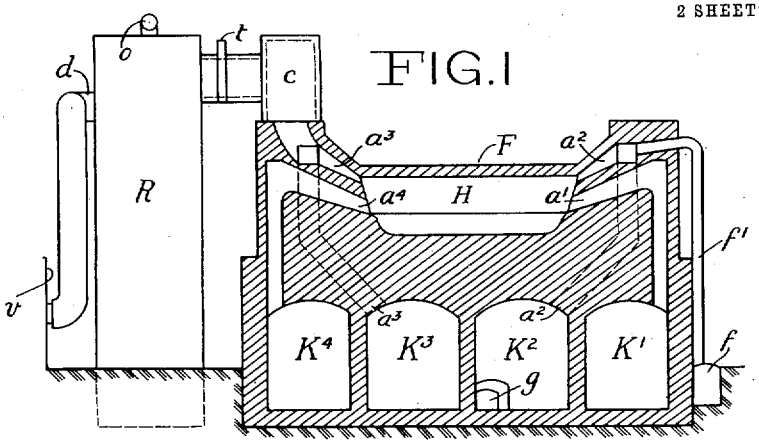
Figure 2:
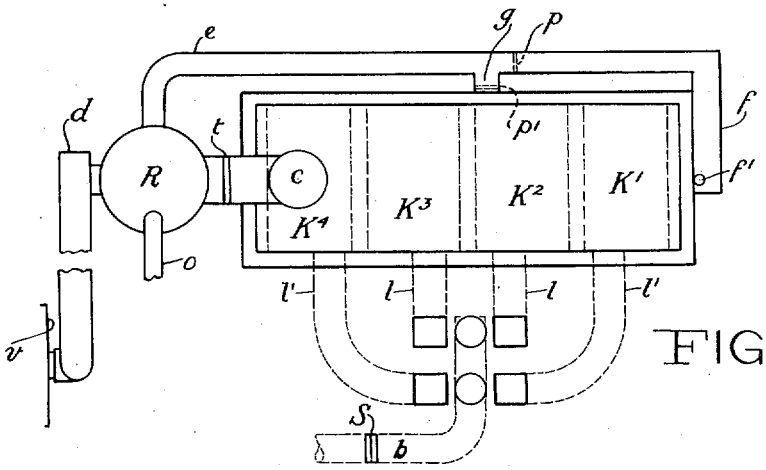
Figure 3:
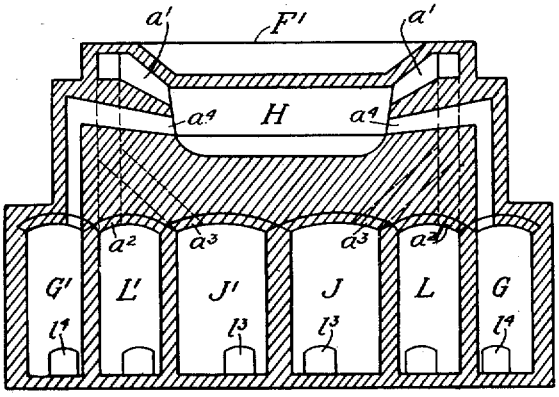
Figure 4:
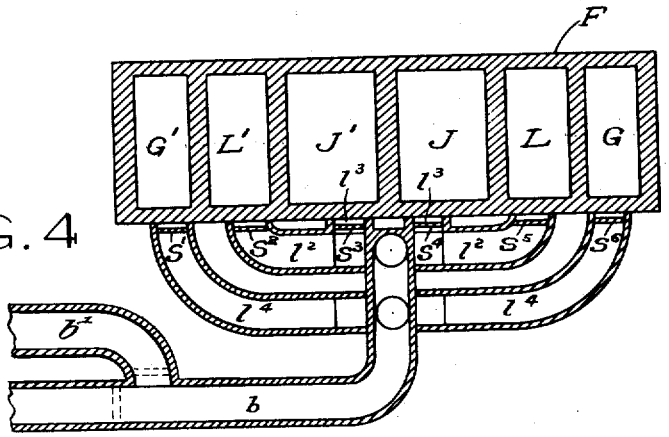
Figure 5:
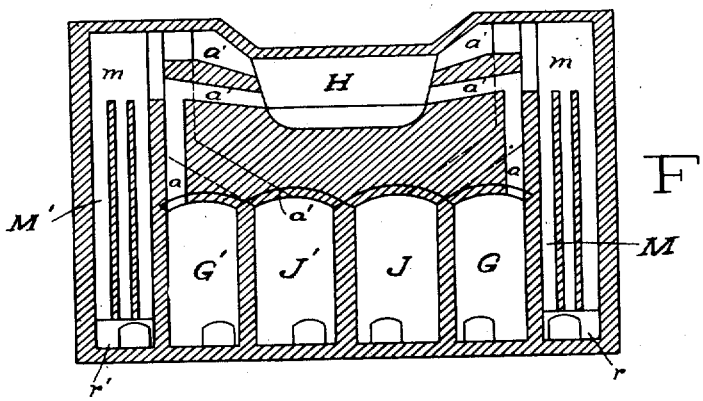
Figure 6:
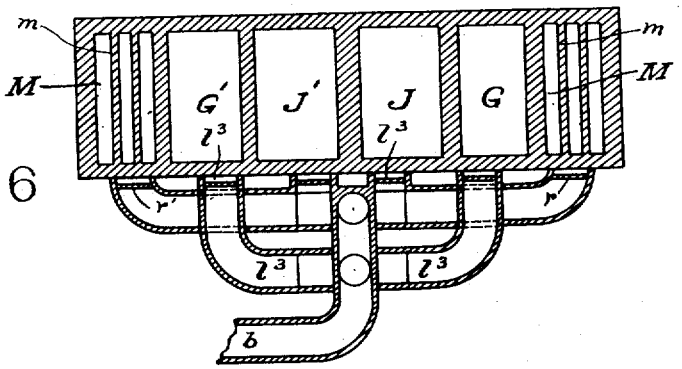

Several forms of my improved furnace are represented by way of example in the accompanying drawings, wherein:

Figure 1 is a side elevation, partly in section, showing a furnace embodying one form of my invention; Fig. 2 is a top plan view thereof; Fig. 3 is a vertical longitudinal section showing another form of the invention; Fig. 4 is a horizontal section of the form shown in Fig. 3; Figs. 5 and 6 are similar views, respectively, showing still another form.

In the form of my improved furnace shown in Figs. 1 and 2 the waste gases are utilized by means of a recuperator. Hence even during the period when the gases are charged with vapors arising from the said metals or their oxids, the air for combustion is preliminarily heated to such a temperature that a sufficiently high temperature is obtained in the furnace.

In the form shown in Figs. 1 and 2, F is a furnace of the known open hearth type, which has the hearth room H arranged in the usual manner near the top thereof. Beneath this hearth H the usual Siemens chambers are arranged of which the inner pair $K^2$, $K^3$ serve for heating the air to be led to the hearth while the outer pair $K^1$, $K^4$, serve for heating the combustible gas before its entrance to the hearth. The channels for guiding the combustible gas to the chambers $K^1$, $K^4$, and also the channels for guiding the air directly to the air chambers $K^2$, $K^3$, are arranged in the usual known manner and therefore are not shown in the drawings. Flues $a^1$, $a^4$, arranged in the brickwork of the furnace F connect the hearth room H with the right and left hand gas chambers $K^1$, $K^4$, and corresponding flues $a^2$, $a^3$, lead from said hearth room to the right and left hand air chambers $K^2$, $K^3$. The four chambers $K^1$, $K^2$, and $K^3$, $K^4$, are connected by conduits $l$ and $l'$ (see Fig. 2) with a main flue $b$ leading to a smoke stack not shown. A damper S of any known construction which may be operated from the outside is arranged in the main flue $b$. From the upper part of the left hand flue $a^3$ another flue $c$ branches off which leads to a recuperator R of any known construction and containing channels for the gases of combustion coming from the hearth H, and other channels for the air to be heated therein before its entrance into the hearth chamber. This air to be heated enters the recuperator R, through a conduit $o$. A fan $e$, may be arranged at the end of the flue $d$, leading from the recuperator R, to produce the necessary draft in the recuperator for sucking off the gas of combustion from the hearth H and drawing in the fresh air. A damper, *t*, similar to the damper S, of the main flue *b* is arranged in the channel or flue *c*. A conduit *e* leading from the air channels of the recuperator R terminates in a channel *f* which conducts the air directly from the recuperator R to the hearth H. Another conduit *g* branches off from said conduit *e* and leads to the right hand air chamber $K^2$. A damper *p* in the conduit *f* controls communication between said conduit *f* and the conduit *e*, duct *f* terminates in the duct *f'* which extends vertically upward and opens into air flue $a^2$ whereas duct *g* opens into air chamber $K^2$ and can be controlled by damper *p'*.

When the furnace is working normally the gases from the hearth-chamber H pass alternately through the right hand and left hand flues $a^1$, $a^2$, and $a^3$, $a^4$ and the chambers $K^1$, $K^2$ and $K^3$, $K^4$ and the main flue *b* to the smoke stack in the usual well known manner. During the volatilization of the metals in question the flue *b* is closed by the damper S and the waste gases flow from the hearth-chamber H through the left flue $a^3$ and conduit *c* to the recuperator R the necessary draft in the recuperator being produced by the fan *v* arranged at the flue *d*.

The air entering through the conduit *o* and preliminarily heated in the recuperator R passes through the flue *e* to the hearth H either directly by way of the flues *f*—*f'*, or first by way of the flue *g* to the right air-chamber $K^2$, where it is heated more highly and thence passes to the hearth where it is used for the combustion. The volatilized metals or oxids may be recovered from the waste gases in the known manner by means of dust chambers and filtration. (*Cf. e. g.* Schnabel, *Handbuch der Metallhüttenkunde*, second edition, Berlin, 1904, p. 289 ff.) The preliminary heating of the air for combustion by a recuperator does not suffice, however, for producing the temperature required, in the open-hearth furnace, whereby the process of volatilization is of course protracted. If the air preliminarily heated in the recuperator is conducted through one air-chamber only for heating it still more, this air-chamber gets considerably cooled as the period of removing the volatile metals is a multiple of the time in which an open-hearth furnace working normally is reversed and the air is caused to go through the other chamber in order to reheat the first chamber. The cooling of the chambers causes of course a prolongation of the duration of the volatilization of the metals and also of the subsequent Martin process, and thus a considerable prolongation of the entire charge. If it is wished to obviate this prolongation of the duration of the charge and nevertheless in each phase of the process to obtain the high preliminary heating of the air for combustion requisite for obtaining a hot flame, I preferably provide the open-hearth furnace with two pairs of air-chambers, which enable different modes of working as desired, instead of providing a recuperator.

In Figs. 3 to 6 two forms of such a Siemens-Martin furnace with two pairs of air chambers are illustrated. Referring first to the form shown in Figs. 3 and 4 the furnace F' is of the same type as that shown in Figs. 1 and 2 and has the hearth H arranged in a similar manner. The ordinary or usual air chambers J, J' are also arranged as in the example shown in Fig. 1 beneath the hearth H. Beside said usual air chambers a second additional pair of air chambers L L' is provided. The gas chambers G and G' arranged in the usual manner are situated at the side of said auxiliary air chambers L and L'. Each of the flues *a'* coming from the hearth room H forks off into two flues $a^2$ and $a^3$ which lead to the auxiliary air chambers L, L' and to the usual air chambers J J' respectively. Conduits $l^2$ (see Fig. 4) connect the right and left hand auxiliary chambers L and L' with the main flue *b* leading to the smoke stack, whereas conduits $l^3$ coming from the usual air chambers J J' open into said conduits $l^2$. The gas chambers G G' are connected with the main flue *b* by channels $l^4$ as usual. All of these conduits or channels $l^2$, $l^3$, and $l^4$ contain dampers $S^1$ to $S^6$ respectively so that each channel may be opened and closed separately.

In the use of such a furnace one pair only of air chambers is constantly used until they become stopped up, which takes place quite gradually and is distinctly perceived beforehand owing to the diminished draft in the furnace, whereupon the other pair which have been cleaned in the meantime and fettled afresh are started working, while the pair now cut out are reëstablished again. Or the two pairs of air-chambers may be used continuously during the same process, the one L, L', being used for the volatilization period of the metals and the other J, J' for the normal working of the furnace. In order to perform these different modes of working it is only necessary to open or close the corresponding dampers $S^1$ to $S^6$ in the conduits $l^2$ to $l^4$.

During the normal working of the furnace when the air-chambers J, J' and the gas chambers G G' are used, the dampers $S^1$, $S^3$, $S^4$ and $S^6$ for the chambers J, J' and G, G' are open, while the dampers $S^2$ and $S^5$ for the chambers L, L' are closed. During the volatilization period, when air for combustion and combustible gas is conducted, for example, through the right-hand side to the furnace, the dampers $S^2$, $S^5$ and $S^6$ must be open, and after the reversal the dampers $S^1$, $S^2$ and $S^5$ will be open and the remainder closed.

The form of the furnace illustrated in Figs. 5 and 6 very nearly resembles that just described, but the auxiliary air chambers M, M′ here are not arranged under the hearth H but laterally thereof. Each auxiliary air chamber here is divided into flues by means of partitions *m* terminating below the entrance opening of the flues *a* and *a′* into said chambers M, M′ and these entrance openings may be closed by dampers *r*, *r′*. This arrangement provides for cleaning of said auxiliary air chambers while the furnace is working, which can be done by closing the dampers *r* and *r′*, while the waste gases are passing through the chambers G and J or G′ and J′. In furnaces such as illustrated in Figs. 3, 4 and 5, 6, the gases of combustion are drawn during the volatilization period by means of an exhauster through a separable flue $b^1$, (Fig. 4,) leading to a place where the metals are recovered (not shown).

Having thus described my invention what I claim as new herein and desire to secure by Letters Patent is:

1. In an open hearth furnace for working up masses containing iron or ferric oxid and volatile metals, the combination with the hearth chamber thereof, of a place of recovery of the volatile metals during the volatilization period and means for causing the gases of combustion to flow and pass from said hearth chamber to said place of recovery during said volatilization period.

2. In an open hearth furnace for working up masses containing iron or ferric oxid and volatile metals, the combination with the hearth chamber thereof of a place of recovery of the volatile metals during the volatilization period, of a flue or passage affording connection between the hearth chamber and said place of recovery, and means for causing the gases of combustion to flow through said flue or passage during said volatilization period.

3. In an open hearth furnace for working up masses containing iron or ferric oxid and volatile metals, the combination with the hearth chamber thereof, of a place of recovery of the volatile metals during the volatilization period, passages leading from said hearth chamber to said place of recovery, means for causing the gases of combustion to flow through said passages from the hearth chamber to the place of recovery during the volatilization period and means for closing said passages during the operation of the furnace in the usual way.

4. In an open hearth furnace for working up masses containing iron or ferric oxid and volatile metals in combination with the hearth chamber thereof, of a place of recovery of the volatile metals during the volatilization period, communicating passageways therebetween, a heat recovering apparatus in communication with said passageways for recovering the heat from the gases passing therethrough during said volatilization period and means for cutting off or closing said passageways during the working of the furnace in the usual way.

5. In an open hearth furnace for working up masses containing iron or ferric oxid and volatile metals in combination with the hearth chamber thereof, a place of recovery for the volatile metals, an intermediate heat recovering apparatus, a communicating passage between the hearth chamber, heat recovering apparatus and the place of recovery of the volatile metals, and means for causing the passage of the gases of combustion from the hearth chamber through said communicating passage to the heat recovering apparatus and the place of recovery of the volatile metals during the volatilization period.

6. In an open hearth furnace for working up masses containing iron or ferric oxid and volatile metals in combination with the hearth chamber thereof, a place of recovery for the volatile metals, an intermediate heat recovering apparatus, a valve controlled communicating passage between the hearth chamber, heat recovering apparatus and the place of recovery of the volatile metals, and means for causing the passage of the gases of combustion from the hearth chamber through said valve controlled communicating passage to the heat recovering apparatus and the place of recovery of the volatile metals during the volatilization period.

7. In an open hearth furnace for working up masses containing iron or ferric oxid and volatile metals, in combination with the hearth chamber thereof, of a place of recovery of the volatile metals during the volatilization period, a valve controlled flue communicating between the hearth chamber and the place of recovery, means for causing the gases of combustion to flow or pass through said valve controlled flue during said period, a recuperator communicating with said valve controlled flue for recovering the heat from the gases passing therethrough, a valve controlled flue connecting said recuperator with the hearth chamber for supplying heated air to said hearth chamber, and means for cutting off said valve controlled flue during the working of the furnace in the usual way.

8. In an open hearth furnace for working masses containing iron or ferric oxid and volatile metals, in combination with the hearth chamber thereof, of a place of recovery of the volatile metals during the volatilization period, a valve controlled flue communicating between the hearth chamber and the place of recovery, means for causing the gases of combustion to flow or pass through said valve controlled flue during said period, a recuperator communicating with said valve controlled flues for recovering the heat from the gases passing therethrough, a valve controlled flue connecting said recuperator with the hearth chamber for supplying heated air to said hearth chamber, and means for cutting off said valve controlled flue during the working of the furnace in the usual way.

9. In an open hearth furnace for working up masses containing iror or ferric oxid and volatile metals the combination with a hearth chamber, air chambers and gas chambers, flues connecting the air chambers and gas chambers, flues connecting the air chambers and gas chambers with the hearth chamber, additional regenerative chambers for recovering the heat from the waste gases, flues connecting said hearth chamber with said additional regenerative chambers and means for causing the gases of combustion to flow through said regenerative chambers during the volatilization period.

10. In an open hearth furnace for working up masses containing iron or ferric oxid and volatile metals in combination with the hearth chamber thereof, a plurality of regenerative chambers independent of the ordinary chambers of the furnace, flues connecting the hearth chamber with said independent regenerative chambers, a place for recovering the volatile metals carried by the waste gases, communicating flues connecting said place of recovery with said independent regenerative chambers, means for guiding the gases during the volatilization period from the hearth chambers into the additional regenerative chambers to permit of the abstraction and recovery of the thermal heat units from the waste gases and thence to the place of recovery of the volatile metals and means for controlling the working of the furnace in the usual way.

In witness whereof I have hereunto set my hand in the presence of two subscribing witnesses.

KURT ALBERT.

Witnesses:
LORITZ WETZEL,
MARIA MENKE.

Copies of this patent may be obtained for five cents each, by addressing the "Commissioner of Patents. Washington, D. C."